US008712952B2

(12) United States Patent
Soulie-Fogelman

(10) Patent No.: US 8,712,952 B2
(45) Date of Patent: Apr. 29, 2014

(54) METHOD AND SYSTEM FOR SELECTING A TARGET WITH RESPECT TO A BEHAVIOR IN A POPULATION OF COMMUNICATING ENTITIES

(75) Inventor: Françoise Soulie-Fogelman, Paris (FR)

(73) Assignee: KXEN, Suresnes (FR)

( * ) Notice: Subject to any disclaimer, the term of this patent is extended or adjusted under 35 U.S.C. 154(b) by 244 days.

(21) Appl. No.: 13/296,686

(22) Filed: Nov. 15, 2011

(65) Prior Publication Data

US 2013/0124448 A1 May 16, 2013

(51) Int. Cl.
*G06F 9/44* (2006.01)
*G06N 7/02* (2006.01)
*G06N 7/06* (2006.01)

(52) U.S. Cl.
USPC ........................................................ 706/52

(58) Field of Classification Search
USPC ........................................................ 706/52
See application file for complete search history.

(56) References Cited

U.S. PATENT DOCUMENTS

2009/0063254 A1 3/2009 Paul et al.
2013/0041860 A1 * 2/2013 Lawrence et al. ............... 706/46

OTHER PUBLICATIONS

Social Network Data Analytics Editor Charu C. Aggarwal IBM Thomas J. Watson Research Center 19 Skyline Drive Hawthorne, NY 10532, USA charu@us.ibm.com.*

Predictive analytics that takes in account network relations: A case study of research data of a contemporary university Ekta Nankani1 Simeon Simoff School of Computing & Mathematics University of Western Sydney.*

Watts et al. "Viral Marketing for the Real World", Harvard Business Review, May 2007.

Fay et al. "WOMMA Influencer Handbook: The Who, What, When, Where, How, and Why of Influencer Marketing", Word of Mouth Marketing Associating, 2010.

Kiss et al. "Identification of Influencers—Measuring Influence in Customer Networks", Decision Support Systems, vol. 46, Issue 1, pp. 233-253.

Romero et al. "Influence and Passivity in Social media", WWW 2011, Hyderabad, India, Mar. 28-Apr. 1, 2011.

Saito et al. "Learning diffusion Probability based on Node Attributes in Social Networks", ISMIS 2011, pp. 153-162, 2011.

Leskovec et al. "The Dynamics of Viral Marketing", ACM Trasactions on the Web, vol. 1, No. 1, Article 5, May 2007.

Cha et al. "Measuring user influence in Twitter: The Million Follower fallacy", Artificial Intelligence, 2010, pp. 10-17.

Duncan J. Watts. "The Accidental Influentials", Harvard Business Review, p. 22-23, Feb. 2007.

Kitsak et al. "Identification of influential spreaders in complex networks", Nature Physics, vol. 6, Issue 11, pp. 888-893, 2010.

* cited by examiner

*Primary Examiner* — Kakali Chaki
*Assistant Examiner* — Ababacar Seck
(74) *Attorney, Agent, or Firm* — McKenna Long & Aldridge LLP

(57) ABSTRACT

The method uses predictive analysis to determine a model based on past data including a first social network built between communicating entities for a first observation period and behavioral centrality measures derived from behavioral data observed in a following time period. The model thus determined is then applied to a second social network built for a second observation period more recent than the first one. This provides predicted behavioral centrality measures for a future period, which can be used to perform an efficient selection of entities in the target, which may maximize virality with respect to the specific behavior of interest.

24 Claims, 6 Drawing Sheets

METHOD AND SYSTEM FOR SELECTING A TARGET WITH RESPECT TO A BEHAVIOR IN A POPULATION OF COMMUNICATING ENTITIES

BACKGROUND OF THE INVENTION

The present invention relates to data analysis techniques usable for identifying, in a population of communicating entities, a group of entities that can form a suitable target in view of their expected ability to influence other entities.

This kind of technique usually makes use of a social network which is a data structure representing existing or passed communication relationships between the entities of the population. An appropriate analysis of the social network can help detecting influencers in the population to better understand propagation of certain phenomena or to decide on certain actions, like for example marketing campaigns, for which word-of-mouth type of propagation is desirable.

The literature on influencers has been growing very fast in the last ten years, with interest coming from many domains (sociology, marketing, political science, and social media for example). There is no real consensus yet on the definition of influencer: from "an individual who exerts influence" to "a person who has a greater than average reach or impact through word of mouth in a relevant marketplace" (B. Fay, et al., "WOMMA Influencer Handbook—The Who, What, When, Where, How, and Why of Influencer Marketing", Word of Mouth Marketing Association, 2010, http://womma.org/influencerhandbook/), definitions range from utter circularity to operational meaning. It usually includes the reference to a social structure through which influence is propagated.

The two main issues described in the literature are about identifying influencers and then acting on influencers (for example, by orienting marketing activities to them rather than to the entire market).

Influencers have first been defined by specific attributes discovered through standard market research techniques and organized in typical categories (for example, "media elite" or "socially connected"). Then, various methods were developed to rank-order entities so as to be able to distinguish those who are key influencers from those with less influence. These methods are mostly based upon centrality measures which one can use to measure how influential an entity is. For example, C. Kiss et al. define structural measures of influence (degree centrality, closeness centrality, betweenness centrality, etc.) and link topological ranking measures (HITS, PageRank, SenderRank) in, "Identification of Influencers—Measuring Influence in Customer Networks", Decision Support Systems, Vol. 46, No. 1, Pages 233-253, December 2008. Other authors have used node position (for example k-shell in "Identifying influential spreaders in complex networks", M. Kitsak, et al., Nature Physics, Vol. 6, No. 11, pp. 888-893, 2010) to identify influencers.

To evaluate performance of these measures for ranking entities, most work has focused on analyzing the propagation of the information flow through the social network. Using ideas stemming from infection diffusion theory in epidemiology, one hypothesizes a propagation model which describes how one node infects its neighbors. Then, the model is used to measure how many people were "infected" by a given entity: it identifies the cascades of entities infected by the original one (J. Leskovec, et al., "The Dynamics of Viral Marketing", ACM Transactions on the Web, Vol. 1, No. 1, Article 5, May 2007). Authors then proceed to estimate the parameters of the diffusion model, such as for example in K. Saito et al., "Learning Diffusion Probability based on Node Attributes in Social Networks". ISMIS 2011. pp 153-162. 2011. The objective of selecting best influencers indeed is to reach the largest possible number of entities as illustrated in FIG. 1. Results have shown that the number of neighbors is not necessarily a good measure of influence (M. Cha, et al., "Measuring User Influence in Twitter: The Million Follower Fallacy", Artificial Intelligence, 2010, pp. 10-17), and that the choice of the propagation model parameters changes the ranking of the various centrality measures. However, most authors claim that centrality measures indeed have predictive power allowing to rank-order entities and select influencers (D. M. Romero, et al., "Influence and Passivity in Social Media", WWW 2011, Hyderabad, India, Mar. 28-Apr. 1, 2011).

However, some authors consider that it is unrealistic to hope to identify influencers and that the "epidemics" analogy is very misleading. See "Viral marketing for the real world", D. J. Watts, et al., Harvard Business Review, Issue May 2007, or "The Accidental Influentials", D. J. Watts, Harvard Business Review, February, 2007, pp. 22-23.

The approach in the present proposal is based on the consideration that instead of positing an a priori propagation model to identify the influencers and then estimate its parameters, it is more efficient—and realistic—to build predictive models using the available data to predict the most probable influencers.

To introduce some notations, we consider a social network in the form of a graph G(N, E) having nodes N indexed by integers i and edges or links E between the nodes. An adjacency matrix or transition matrix of graph G is defined as $A=(a_{ij})$ where $a_{ij}$ is a weight of the link from node i to node j ($a_{ij}=0$ if there is no link from node i to node j in G). An unweighted transition matrix corresponds to the case where $a_{ij}=1$ if there is a link from node i to node j and $a_{ij}=0$ else. Weighted transition matrices can, for example, be defined for a graph whose nodes represent communicating entities, where the $a_{ij}$s have amplitudes depending on factors such as duration of communication from i to j, or from number of calls from i to j, etc. The neighbors of a node i in the graph can be grouped in different subsets as illustrated in FIG. 2:

- the "out-circle" $OC_i$ of node i is the set of nodes of G linking out of i, that is $OC_i=\{j: a_{ij}\neq 0\}$;
- the "in-circle" $IC_i$ of node i is the set of nodes of G linking into i: $IC_i=\{j: a_{ji}\neq 0\}$;
- the "circle" $C_i$ of node i is the set of all the nodes of G linked to i: $C_i=OC_i \cup IC_i=\{j: a_{ij}\neq 0 \text{ or } a_{ji}\neq 0\}$.

If the links in the graph are not directed, i.e. if they represent communication between nodes regardless of direction of communication, the in-circle and out-circle cannot be distinguished. In this case $a_{ij}=a_{ji}$ and the circle of a node i can be defined as $C_i=\{j: a_{ij}\neq 0\}$.

Examples of conventional structural centrality measures include:

- degree centrality, Degree(i), that is the number of nodes in the circle: $\text{Degree}(i)=\text{Card}(C_i)$;
- weighted degree centrality:

$$\text{w\_Degree}(i) = \sum_{j\neq i} (a_{ij} + a_{ji});$$

- in-degree centrality, InDegree(i), that is the number of nodes in the in-circle: $\text{InDegree}(i)=\text{Card}(IC_i)$;

weighted in-degree centrality:

$$w\_InDegree(i) = \sum_{j \neq i} a_{ij};$$

out-degree centrality, OutDegree(i), that is the number of nodes in the out-circle: OutDegree(i)=Card($OC_i$);

weighted out-degree centrality:

$$w\_OutDegree(i) = \sum_{j \neq i} a_{ij};$$

clustering coefficient, CC(i), which measures how more likely two neighbors are connected, compared to two random nodes. It is computed as $$CC(i) = \frac{2 \times Nb\_Tr(i)}{Degree(i) \times (Degree(i) - 1)}$$

from the degree centrality Degree(i) and the number Nb_Tr (i) of triangles in the graph having node i as a vertex: Nb_Tr(i)=Card({(j, l)$\in C_i \times C_i$; j≠l/$a_{jl} \neq 0$});

betweeness centrality, CB(i), which measures the extent to which a node is between many nodes:

$$CB(i) = \sum_{\substack{j \neq i \\ l \neq j,i}} \frac{g_{jl}(i)}{g_{jl}},$$

where the length of a path between two nodes is the number of edges in the path, $g_{jl}$ is the shortest path length from node j to node l (also called the geodesic distance) and $g_{jl}(i)$ is the number of shortest paths between node j and node l going through node i.

While degree centralities are easy to compute, more sophisticated measures can hardly be computed on large networks. For example, betweenness centrality scales as $n^2$ (n being the number of nodes in the graph), which makes it impractical for large networks. Many more measures exist with the same problem of non-scalability.

Structural centrality measures do not take into account the specific behavior for which influence is being analyzed. With structural centrality measures, if a node is an influencer for a behavior A, it is also an influencer for another behavior B.

On the Web, influence is referred to as popularity. Some web pages are very popular. An algorithm used by search engines to identify popular pages is known under the trademark PageRank. It is based on the consideration that a page is popular if pages linking into it (i.e. in in-circle) are popular. PageRank centrality CPR(i) is computed iteratively as $$CPR(i) = (1 - d) + d \times \sum_{j \in IC_i} \frac{CPR(j)}{OutDegree(j)},$$

d being the probability that, at each page, a user requests a random page (d=0.85 usually). PageRank only takes into account incoming links. Approximation by the in-degree centrality is generally accurate.

Symmetrically, SenderRank centrality, CSR(i), can be defined as equivalent to PageRank centrality for outgoing links. The influence of a node i then depends on the influence of nodes it links into, i.e. of its out-circle:

$$CSR(i) = (1 - d') + d' \times \sum_{j \in OC_i} \frac{CSR(j)}{OutDegree(j)},$$

d' being the probability that a node will transfer to a random node. Computation of CSR(i) is iterative and happens in a few iterations (as for PageRank). It can be approximated by the out-degree centrality.

PageRank and SenderRank are based on the link topology of the network. In this regard, they are still structural measures which cannot take into account a specific behavior.

In certain cases, attributes of the nodes (e.g. demographics, customer care history, account history, etc.) can be taken into consideration in the identification of influencers in combination with a social network representation (see, e.g. US 2009/0062354 A1).

There is a need for an efficient method of analyzing social network data and past behavioral data in view of determining a target of communicating entities that is designed with respect to a specific behavior.

SUMMARY OF THE INVENTION

A method of selecting a target with respect to a specific behavior as a group of entities in a population of communicating entities is proposed. A social network representation is used for the population of communicating entities in a plurality of observation periods. For an observation period, a social network has nodes respectively representing the entities of the population and links between the nodes. Each link between two nodes represents at least one communication event observed in the observation period between the entities represented by the two nodes. Each node is associated with a respective set of at least one node connected thereto by one of the links. The method of selecting the target comprises:

- obtaining a first social network for a first observation period;
- obtaining behavioral data indicating adoption of the specific behavior by entities of the population in a time period following the first observation period;
- computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;
- building a predictive model having input data and first predicted behavioral centrality measures as output data, the predictive model being determined to provide a best match of the computed behavioral centrality measures with first predicted behavioral centrality measures resulting from application of the predictive model to input data from the first social network;
- obtaining a second social network for a second observation period more recent than the first observation period;
- applying the predictive model to input data from the second social network to provide second predicted behavioral centrality measures; and
- selecting entities to be in the target based on information including the second predicted behavioral centrality measures.

The method uses predictive analysis to determine a model based on past data including the first social network and behavioral centrality measures derived from the behavioral data observed in a following time period. The model thus determined is then applied to the second social network which has been obtained for a more recent observation period. This provides predicted behavioral centrality measures for the future period, which can be used to select the entities of the target.

In an embodiment, the behavioral centrality measures include, for each node i of the first social network, a respective measure computed as a sum of terms $a_{ij} \times B_j$ for nodes $j \neq i$ belonging to the set of connected nodes associated with node i, where $a_{ij}$ is a weight associated with the link between nodes i and j, $B_j=1$ if node j is associated with an entity that adopted the behavior in the aforesaid time period according to the behavioral data and $B_j=0$ else. Such measure can be unweighted ($a_{ij}=1$ for any pair of connected nodes i, j) or weighted with coefficients given by weights assigned to the links of the first social network (for example, duration of communication from the entity associated with node i to the entity associated with node j during the first observation period, number of communication events from the entity associated with node i to the entity associated with node j, . . . ). Such measure is then referred to as the "influence power" of node i.

In the non-limiting case of directed links in the social network representation, each link from a first node to a second node in the social network for an observation period represents at least one communication event observed in that observation period from the entity represented by the first node to the entity represented by the second node. In such a case, the set of connected nodes associated with one node of the first social network may consist of any other nodes of the first social network such that the first social network has a link from said one node to said other node. The above-mentioned behavioral centrality measure computed as $$IP_i = \sum_{j \neq i} a_{ij} \times B_j$$

is then referred to as the "influence power" of node i.

In the case of directed links, the method may further comprise determining influence cascades originating from respective nodes of the first social network. The influence cascade originating from a node $j_0$ is defined as a sequence of distinct nodes $j_1, j_2, \ldots, j_k$ of the first social network for a positive integer k, such that:

- for any $p=0, \ldots, k-1$, the first social network has a link from node $j_p$ to node $j_{p+1}$;
- the entity represented by node $j_1$ in the first social network adopted the behavior in the aforesaid time period according to the behavioral data; and
- for any $p=1, \ldots, k-1$, the entity represented by node $j_{p+1}$ in the first social network adopted the behavior after the entity represented by node $j_p$ in the time period according to the behavioral data.

The computed behavioral centrality measure may then include respective influence reach measures for nodes of the first social network, where the influence reach measure for one node of the first social network is the number of distinct nodes of the first social network belonging to at least one influence cascade originating from said one node.

The influence cascades can also be used to compute a final reach value, for example for evaluating performance of the method based on the final reach value. Where the selection of entities in the target uses a selection scheme applied to information including the second predicted behavioral centrality measures, the same selection scheme is applied to information including the behavioral centrality measures computed from the first social network and the behavioral data to determine a pseudo-target. A final reach value is then determined as a number of distinct nodes of the first social network that are in at least one influence cascade of at least one node of the first social network representing an entity of the pseudo-target.

The selection of entities in the target can be based on a combination of the predicted behavioral centrality measures, obtained by applying the predictive model to the input data from the second social network, and behavioral prediction scores respectively determined for the entities of the population using another model for prediction of potential future adoption of the behavior.

In an embodiment, the selection of entities in the target is based on information including the predicted behavioral centrality measures, obtained by applying the predictive model to the input data from the second social network, and behavioral prediction scores determined by applying another predictive model to input data from the second social network, the other predictive model having input data and behavioral prediction scores as output data and being determined to provide a best match of the observed behavior with predicted behavioral prediction scores resulting from application of the other predictive model to input data from the first social network.

Another aspect of the invention relates to a data analysis system for selecting a target with respect to a specific behavior as a group of entities in a population of communicating entities by applying a selection method as outlined above.

Yet another aspect of the invention relates to a computer-readable medium having computer program instructions stored thereon for carrying out steps of a method of selecting a target with respect to a specific behavior as outlined above when said instructions are executed in a computer processing unit of a data analysis system.

Other features and advantages of the method and system disclosed herein will become apparent from the following description of non-limiting embodiments, with reference to the appended drawings.

BRIEF DESCRIPTION THE DRAWINGS

DESCRIPTION OF EMBODIMENTS

Figure 1:
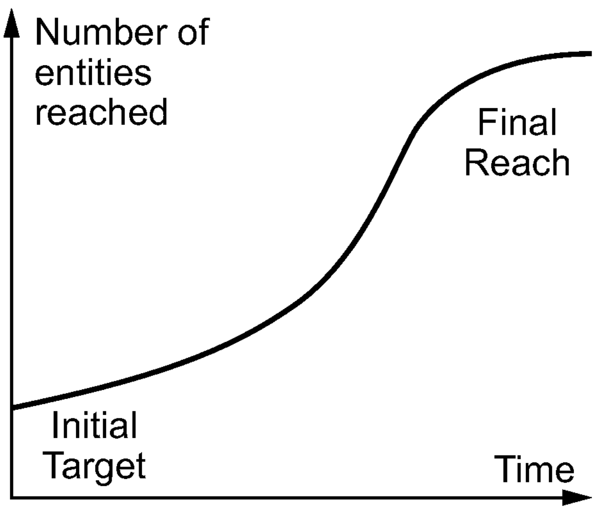
FIG. 1 is a diagram illustrating the selection of relevant influencers in a viral marketing action.
Figure 2:
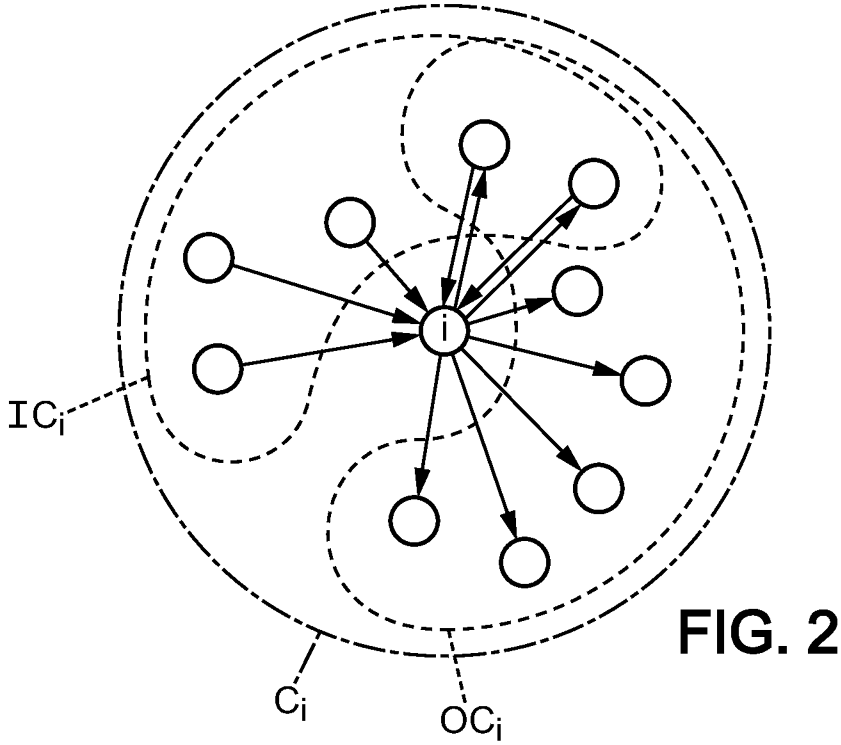
FIG. 2 is a diagram illustrating the notions of in-circle, out-circle and circle for a node i of a social network structure.

The method disclosed herein makes use of behavioral centrality measures in the selection of a target among a population of communicating entities. The selection is performed so as to maximize virality in the population with respect to a specific behavior, i.e. the method is designed to finally reach as many entities as possible from the selection of an initial target (FIG. 1) in view of the specific behavior of interest.

The communicating entities can be of various kinds.

A typical example is communicating entities consisting of customers of one or more telecommunication operators. In this case, a social network can be built in a conventional manner, for example from call data records (CDRs) collected within the operator's infrastructure for accounting purposes. By processing the CDRs collected in a given period of time, referred to here as an observation period, a social network can be built as a graph where each node i represents a customer $A_i$ (communicating entity) and each link between two nodes i, j represents the existence of one or more communication event which took place during the observation period between the customers $A_i$ and $A_j$ represented by the two nodes. A link can be directed ($A_i$ called $A_j$—the link is from node i to node j, or $A_j$ called $A_i$—the link is from node j to node i) or not (there has been communication between $A_i$ and $A_j$, regardless of who called who). The links can be unweighted, or weighted by different factors such as duration of call between $A_i$ and $A_j$, number of calls during the observation period, etc.

Many other kinds of populations of communicating entities can receive application of the method described herein. In general, it refers to a telecommunications network in which the traffic can be observed to gather transactional data used build the social network representation. In another example, the communicating entities can consist of smart cards which are presented to various smart card reading terminals connected to a network for financial transactions, or use of certain services . . . . In this example, a node for a smart card may have a link to a node for another smart card if transaction records show that these two smart cards have been successively presented to the same terminal during the observation period. Alternatively, it may also be useful, depending on the application, to consider the smart card reading terminals as communicating entities organized in a social network such that a node for a terminal has a link to a node for another terminal if transaction records show that these two terminals have successively read the same smart card during the observation period. In another example, the communicating entities can consist of customers who buy various products, or services. In this example, a node for a customer may have a link to a node for another customer if transaction records show that these two customers bought the same product during the observation period. Alternatively, it may also be useful, depending on the application, to consider the products as communicating entities organized in a social network such that a node for a product has a link to a node for another product if transaction records show that these two products were successively bought by the same customer during the observation period.

The nodes of the social network can be associated to, or "decorated" with, a number of attributes including various kind of information related to the entities represented by the nodes (for example name, address, age, customer account information, etc.) and also information relating to the topology of the social network (for example degree centralities as mentioned above, Degree(i), InDegree(i), OutDegree(i), weighted or non-weighted, . . . ).

In the context of the present invention, one or more node attributes relate to information about a behavior B which may have been adopted by the entity represented by a node, e.g. a customer used certain services available through an operator's network, the customer called customer service, the customer paid his/her bills, the customer terminated subscription ("churned" in the jargon of telephone companies), a smart card was determined to be fake, a terminal was detected to have been used in fraudulent transactions, etc.

Such attributes relating to behavioral information, associated with the nodes of the social network structure, are derived from behavioral data relating to a time period following the observation period corresponding to the social network. These behavioral data indicate adoption or non-adoption of the specific behavior B by the entities of the population during the time period, for example with a binary value $B_i$ such that $B_i=1$ if the entity represented by node i has adopted the behavior and $B_i=0$ else. If available, the timing of the adoption of the behavior may also be taken as an attribute, e.g. with a time value $TB_i=t$ if the entity represented by note i has adopted the behavior at a time t included in the time period covered by the behavioral data.

Figure 3:
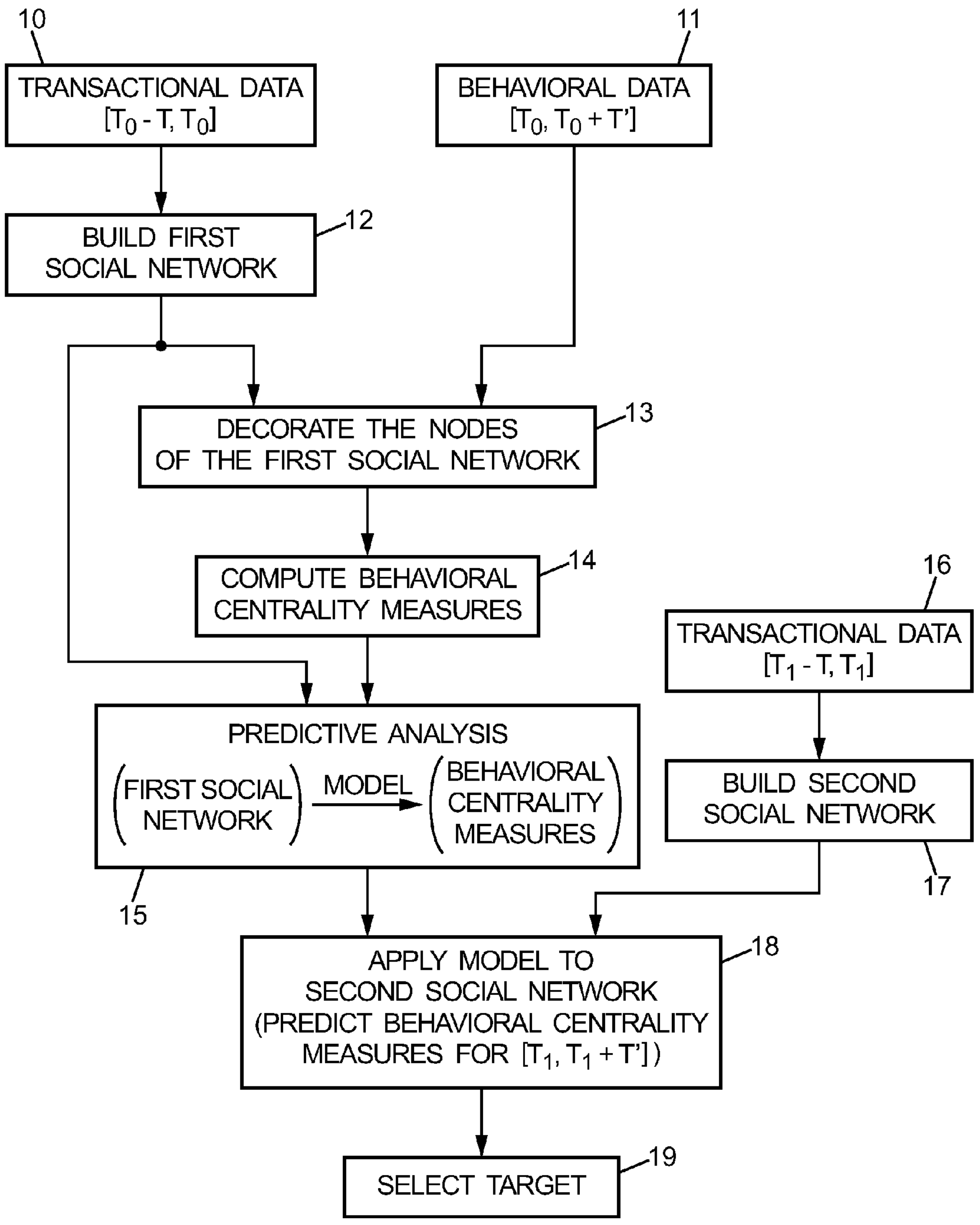
FIG. 3 is a flowchart of an embodiment of the method according to the present invention.

Referring to FIG. 3, which shows an embodiment of the method of selecting a target among the population of communicating entities, blocks 10 and 11 represent inputs for an analysis part of the method. Transactional data 10, e.g. CDRs, are obtained with respect to a first observation period of duration T, i.e. $[T_0-T, T_0]$, and processed conventionally in a step 12 to build a first social network SN0.

In one embodiment where the transactional data 10 are CDRs, these CDRs can be aggregated to form a table having a respective row for each {calling party, called party} pair between which one or more calls took place during the observation period $[T_0-T, T_0]$, the row indicating the number of calls during the observation period $[T_0-T, T_0]$ and the accumulated duration of these calls. From such a table, different kinds of social networks SN0 can be built in step 12, e.g. directed weighted by duration, directed weighted by number of calls, directed unweighted, non-directed weighted by number of calls, non-directed weighted by duration, . . . .

Structural features for each node i in the network are also determined in step 12 to decorate the nodes of the social network: Degree(i) weighted and unweighted, InDegree(i) weighted and unweighted, OutDegree(i) weighted and unweighted, communities' size of the node, community index of the node in the different networks, . . . .

If information about the entities that adopted behavior B during the first observation period $[T_0-T, T_0]$ is available, one of the attributes added when building the social network may be computed in step 12 as the "social pressure" defined as follows. The social pressure measures how much a node is influenced on a certain behavior B by its "friends" (the nodes linking into that node in the social network). The social pressure SP(i) on a node i of the first social network SN0 measures how much friends who have adopted the behavior at time $T_0$ influence node i to adopt that behavior later. It is computed using the in-circle $IC_i$ of that node in the first social network as $$SP(i) = \sum_{j \in ICi} a_{ij} \times B_j^{T_0},$$

where: $B_j^{T_0}=1$ if node j of the in-circle of node i represents an entity that adopted the behavior B before time $T_0$;

and $B_j^{T_0}=0$ if node j represents an entity that has not adopted the behavior B at $T_0$.

In the above formula defining the social pressure SP(i), $a_{ji}$ designates the weight of the link from node j to node i in a weighted version of the social network. If we are dealing with an unweighted social network, then $a_{ji}=1$ for every link from node j to node i in the social network SN0.

In step 13, the behavioral data 11 obtained for a time period of duration T', i.e. [$T_0$, $T_0$+T'], following the first observation period [$T_0$−T, $T_0$] are processed to further decorate the nodes of the first social network. Each node i of the first social network SN0 then has one or more attributes to indicate whether the entity represented by the node has adopted the specific behavior during the time period [$T_0$, $T_0$+T'] ($B_i$), and/or at what date/time the behavior was adopted ($TB_i$).

From the first social network in the form of a set of decorated nodes with links between them, behavioral centrality measures are computed in step 14 for the respective nodes.

Different kinds of behavioral centrality measures can be used, individually or in combination, in the context of the present invention.

A particularly relevant type of behavioral centrality measure, referred to as the influence power, measures the power that a node has to influence its friends for a certain behavior B. The influence power IP(i) of a node i at time $T_0$ measures how many nodes will have adopted that behavior B after a given time interval T'. It is computed by means of a sum over a set of connected nodes associated with node i which consists of the out-circle $OC_i$ of that node in the first social network:

$$IP(i) = \sum_{j \in OCi} a_{ij} \times B_j.$$

Considering a node $j_0$ of the first social network SN0, a simple routine is applied to determine all the sequences of distinct nodes $j_1, j_2, \ldots, j_k$ of the first social network (k>0) such that:

- for any p=1, . . . , k, $B_{j_p}$=1, i.e. the entity represented by node $j_p$ adopted behavior B during [$T_0$, $T_0$+T'] according to the behavioral data 11;
- for any p=0, . . . , k−1, node $j_{p+1}$ belongs to the out-circle of node $j_p$ ($j_{p+1} \in OC_{j_p}$);
- for any p=1, . . . , k−1, $TB_{j_{p+1}} > TB_{j_p}$, i.e. the entity represented by node $j_{p+1}$ adopted behavior B after the entity represented by node $j_p$ according to the behavioral data.

Figure 4:
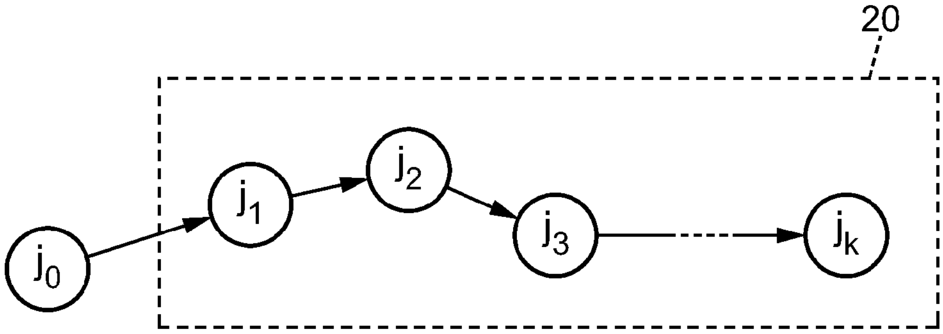
FIG. 4 is a diagram illustrating the notion of influence cascade.
Figure 5:
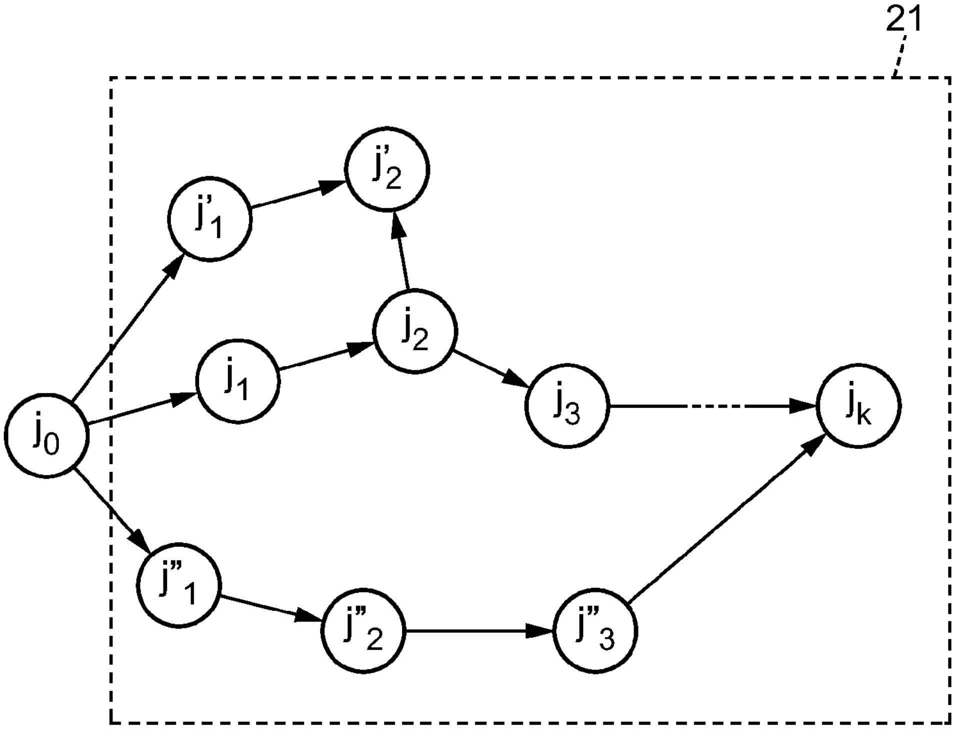
FIG. 5 is a diagram illustrating the notion of influence reach.

Such a sequence of nodes $j_1, j_2, \ldots, j_k$ is called an influence cascade 20 originating from a node $j_0$ (FIG. 4). The influence reach 21 of a node is then defined as the set of nodes formed by the union of all the influence cascades originating from that node (FIG. 5). It is noted that influence cascades originating from a given node $j_0$ can partly overlap.

The influence reach measure for a node may be taken as the number of nodes (cardinal) of its influence reach. In other words, the influence reach measure IR(i) for node i is the number of distinct nodes of the first social network SN which belong to at least one influence cascade originating from node i:

$$IR(i) = \mathrm{Card}\left\{ j_k \in SN0,\ k \geq 1 \,/\, \exists\, (j_1, \ldots, j_{k-1}) \in SN0 : \begin{bmatrix} j_1 \in OC_i,\ j_2 \in OC_{j_1}, \ldots, j_k \in OC_{j_{k-1}} \\ B_{j_1} = \ldots = B_{j_{k-1}} = B_{j_k} = 1 \\ T_0 < TB_{j_1} < \ldots < TB_{j_{k-1}} < TB_{j_k} \leq T_0 + T' \end{bmatrix} \right\}$$

where: $B_j = B_j^{T_0+T'} = 1$ if node j of the out-circle of node i represents an entity that adopted the behavior B in the time period [$T_0$, $T_0$+T'] according to the behavioral data 11;

and $B_j$=0 if node j represents an entity that did not adopt the behavior B during [$T_0$, $T_0$+T'].

A high influence power value from a node i on nodes of its out-circle increases their chances of adopting the behavior B, i.e. increases virality of B.

It will be appreciated that there can be nodes having a high influence power but that did not adopt the behavior B themselves. For example, a non-churner can influence his friends into churning, even though he cannot churn (because of the status of his subscription). A geek can influence his friends into buying some cool product, even though he cannot afford buying it. While it may often be expected that the influence power will be higher for those who adopted B than for those who did not, this might depend on the behavior of interest.

A variant of the influence power can be determined as $$IP'(i) = \sum_{j \in C_i} a_{ij} \times B_j$$

in the case of non-directed links in the social network representation, using the circle $C_i$ of a node i instead of its out-circle $OC_i$ as the associated set of connected nodes over which the sum is computed.

Another relevant type of behavioral centrality measure is referred to as the influence reach measure. It is evaluated using the out-circle $OC_i$ as the set of connected nodes associated with a node i, by determining "influence cascades".

In step 15 of FIG. 3, a predictive analysis is performed to learn a predictive model whose variables (input data) are extracted from a social network and whose predictions (output data) represent behavioral centrality measures computed for the nodes of that social network. The predictive analysis is made on variables consisting of data from the first social network SN0 built in step 12 in order to predict the behavioral centrality measures computed in step 14 for the nodes of SN0. It consists in the configuration of a predictive model and an adjustment of its parameters so as to provide a best match of the behavioral centrality measures computed in step 14 by predicted behavioral centrality measures resulting from application of the predictive model to the input data (variables) from the first social network SN0.

In an embodiment, the variables of the model can be of different types:

- social network structural attributes: degree, community information, social pressure, etc.;
- social and demographic attributes;
- contract-related information (given by the operator), . . . .

They do not include attributes (e.g. $B_i$, $TB_i$) relating to what happened at times after $T_0$ because the corresponding attributes will not be known at the time of applying the model to a more recent social network.

In an embodiment, the information about certain nodes can also be disregarded in the model variables if it makes sense for the analyst. For example, if the behavior B is churning for telecom operators, the nodes corresponding to customers who churned during the first observation period [$T_0$−T, $T_0$] considered for the network construction are removed to prevent modifying the distribution because when applying the model later, customers who churned will not have to be put into the target.

An example of robust algorithm usable in the predictive analysis step 15 is that disclosed in U.S. Pat. No. Re 42,440.

In FIG. 3, block 16 represents another input of the method, namely transactional data, e.g. CDRs, obtained with respect to a second observation period $[T_1-T, T_1]$, of duration T, which is more recent than the first observation period $[T_0-T, T_0]$, i.e. $T_1>T_0$. In step 17, the transactional data 16 are processed conventionally, using the same processing as in step 12, to build a second social network SN1. In step 17, the same node attributes as discussed before (except for the behavioral centrality measures which are unknown at time $T_1$) are computed with respect to the second observation period $[T_1-T, T_1]$ in order to decorate the nodes of the second social network.

In step 18, the variables from the second social network SN1 thus obtained are input to the predictive model previously determined in step 15. The same variables as in the predictive analysis step 15 are used in step 18, but instantiated for period $[T_1-T, T_1]$. Application of the predictive model provides predicted behavioral centrality measures for the period $[T_1, T_1+T']$.

Those predicted behavioral centrality measures are then used in step 19 to select the entities of the target TG1 among the population of entities represented in the second social network SN1.

Different approaches can be used in the selection step 19 using the behavioral centrality measures predicted for the period $[T_1, T_1+T']$. If one type of centrality measure is computed, e.g. the influence power IP(i), a simple possibility is to take in the target the Q nodes having the highest predicted centrality measures, where Q is a preset number, or the nodes whose predicted centrality measures exceed a preset threshold. If centrality measures of several types are predicted, e.g. the influence power $\hat{IP}(i)$ and the influence reach value $\hat{IR}(i)$, it is possible to combine them for selecting the entities/nodes put in the target TG1.

Figure 6:
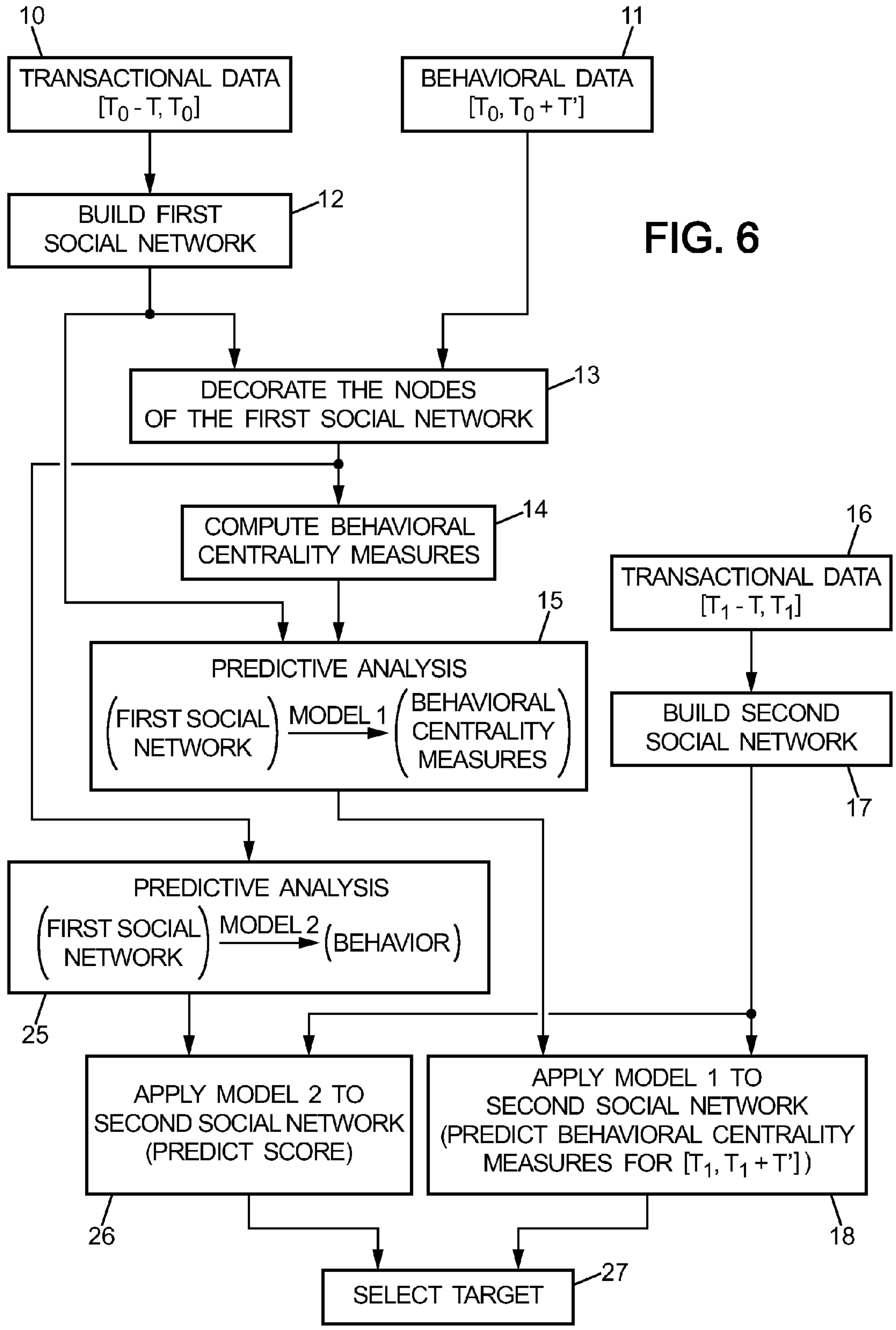
FIG. 6 is a flowchart of another embodiment of the method according to the present invention.

Another possibility illustrated by FIG. 6 is to use a second model, for prediction of potential future adoption of the behavior by the nodes/entities of the social network, in the selection process.

In FIG. 6, the same reference numerals as in FIG. 3 are used to designate the same elements or steps. The second model is learnt in a second predictive analysis step 25 based on the first social network built SN0 in step 12, in order to predict the behavioral data $B_i$ which indicate adoption or non-adoption of the specific behavior B by the entities of the population represented by the nodes i of SN0. The predictive model is configured and its parameters are adjusted so as to provide a best match of the behavioral data $B_i$ by behavioral prediction scores $\hat{B}_i$ resulting from application of the second predictive model to the input data (variables) from the first social network SN0. It can also be determined using the robust modeling algorithm disclosed in U.S. Pat. No. Re 42,440, or any other suitable predictive analysis method.

Again, the variables of the second model can be of different types:

- social network structural attributes: degree, community information, social pressure, etc.;
- social and demographic attributes;
- contract-related information (given by the operator), . . . , excluding attributes relating to what happened at times after $T_0$ (e.g. $B_i$, $TB_i$) because the corresponding attributes will not be known at the time of applying the model to a more recent social network. They need not be the same as the variables of the first predictive model determined in step 15.

In an embodiment, the behavioral data $B'_i$ fed to the predictive analysis step 25 do not cover the whole time period $[T_0, T_0+T']$, but a shorter period $[T_0+\epsilon, T_0+T'']$, where $\epsilon\geq 0$ and $T''<T'$, i.e. $B'_i=B_i\cdot\lambda_i$ where $\lambda_i=1$ if $TB_i\in[T_0+\epsilon, T_0+T'']$ and $\lambda_i=0$ if $TB_i\notin[T_0+\epsilon, T_0+T'']$. For example, a possibility is to take $T''=T'/2$ and $\epsilon$ representing a time lag of few days in anticipation of the time needed for an operator to call the potential future churners.

In step 26 which is run in parallel with the above-described step 18, the second model learnt in step 25 is applied to the relevant variables from the second social network. This provides respective behavioral prediction scores $\hat{B}_i$ for the nodes i of the second social network SN1 built in step 17. These scores $\hat{B}_i$ can be regarded as increasing functions of the entities' expected propensity to adopt the behavior B during the period $[T_1, T_1+T']$ or $[T_1+\epsilon, T_1+T'']$ following the present time $T_1$ ($\hat{B}_i=1$ for a very high probability that node i adopts B, $\hat{B}_i=0$ for a very low probability that node i adopts B).

The selection of entities to be put in the target TG1 is performed in step 27 of FIG. 6 using the behavioral prediction scores $\hat{B}_i$ computed in step 26 and the predicted behavioral centrality measures computed in step 18. The selection is then based on a combination of the scores $\hat{B}_i$ and one or more predicted behavioral centrality measures, e.g. $\hat{IP}(i)$, $\hat{IR}(i)$, . . . . For example, the nodes can be ranked in decreasing order of a selection criterion consisting of the product $\hat{B}_i\times\hat{IP}(i)$ so as to favor selection of entities having both a high behavioral prediction score and a high predicted influence power. To adjust the relative importance of the two quantities, the criterion may involve a positive exponent $\alpha$, being computed as $\hat{B}_i^{\alpha}\times\hat{IP}(i)$.

In order to evaluate performance of the selection method, key performance indicators (KPIs) may be computed. The target selection process can be performed several times on the basis of the first social network SN0 by trying different types of social network (directed on not, weighted or not, . . . ), different behavioral centrality measures and/or different input variables for the model(s), so as to identify the details of the selection method which provides optimal KPIs. That particular selection method will eventually be used for deciding what appears to be the most relevant target TG1 for the future time period $[T_1, T_1+T']$ or $[T_1+\epsilon, T_1+T'']$. Computation of the KPIs is performed with reference to a potential target, or pseudo-target, determined a posteriori by looking at the transactional data 10 for the first observation period $[T_0-T, T_0]$ and the behavioral data 11 for the following time period $[T_0, T_0+T']$ or $[T_0+\epsilon, T_0+T'']$. The pseudo-target TG0 is determined by selecting entities of the first social data network SN0 using the same selection scheme as in step 19 (FIG. 3) or 27 (FIG. 6) based on the behavioral centrality measures computed in step 14 and scores which are known to be 1 or 0 depending on whether or not the entities represented by the nodes of the first social data network SN0 adopted behavior B or not in the following time period $[T_0, T_0+T']$ or $[T_0+\epsilon, T_0+T'']$.

Different forms of KPIs can be designed to fit that purpose. An interesting one is a final reach value associated with the pseudo-target TG0.

Figure 7:
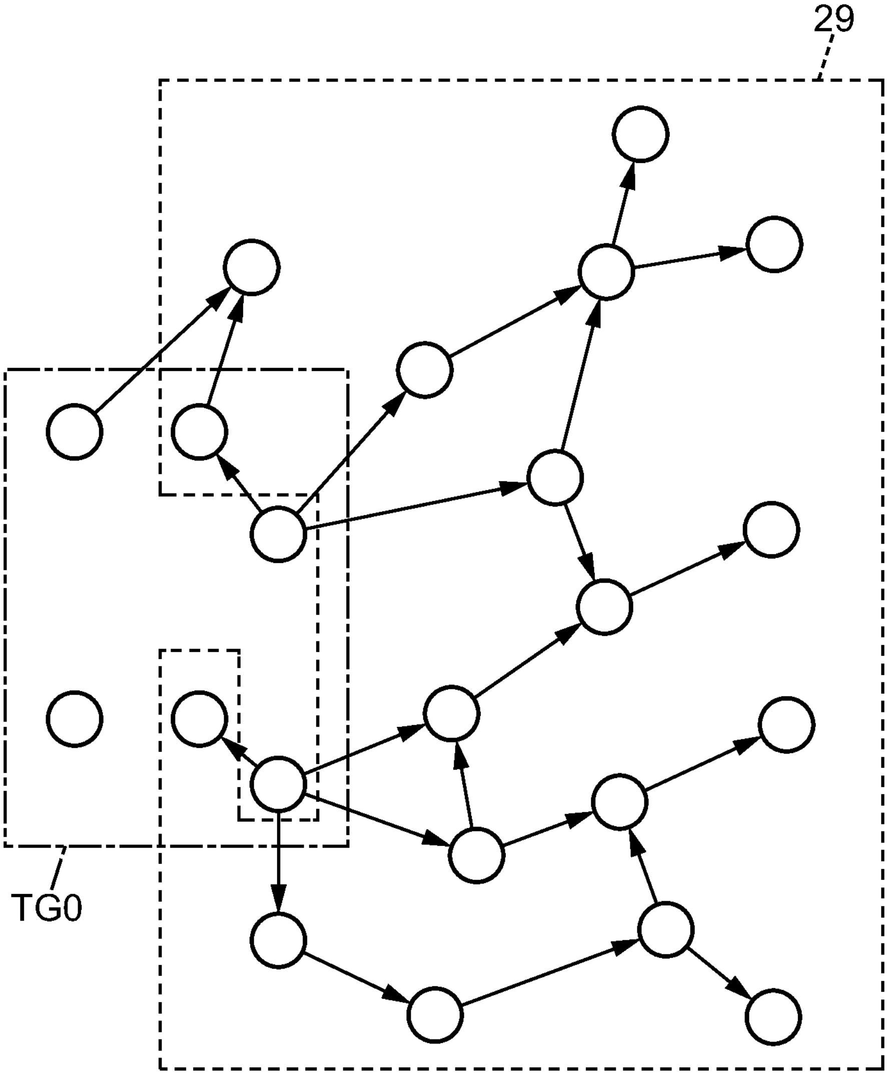
FIG. 7 is a diagram illustrating the notion of final reach.

As illustrated in FIG. 7, the final reach 29 associated with TG0 is defined as the set of nodes formed by the union of all the influence reaches of the nodes of TG0 (or of all the influence cascades originating from those nodes). The final reach does not include nodes of the pseudo-target TG0, unless such nodes were influenced by another node of TG0. Its size measures the virality effect specifically for behavior B. It does not include nodes representing entities which adopted B "alone", i.e. without having first communicated with another entity that previously adopted B.

The final reach value FR is the number of nodes in the final reach. In other words, it is the number of distinct nodes of SN0 that are in at least one influence cascade of at least one node of SN0 representing an entity of TG0:

$$FR = \mathrm{Card}\left\{ j_k \in SN0,\ k \geq 1 \Big/ \begin{matrix} \exists\, i \in TG0 \\ \exists\,(j_1, \ldots, j_{k-1}) \in SN0 \end{matrix} : \begin{bmatrix} j_1 \in OC_i,\ j_2 \in OC_{j_1}, \ldots, j_k \in OC_{j_{k-1}} \\ B_{j_1} = \ldots = B_{j_{k-1}} = B_{j_k} = 1 \\ T_0 < TB_{j_1} < \ldots < TB_{j_{k-1}} < TB_{j_k} \leq T_0 + T' \end{bmatrix} \right\}$$

Other KPIs can be used, including the so-called influence rate. For a node i, the influence rate IRT(i) is defined as the ratio of the influence power IP(i) to its out-degree centrality: IRT(i)=IP(i)/OutDegree(i). This measures how many friends in its out-circle a node can influence. For the target TG0, the influence rate Infl_Rate(TG0) is the average of the influence rates of the nodes in the target:

$$\mathrm{Infl\_Rate}(TG0) = \frac{1}{Q} \cdot \sum_{i \in TG0} IRT(i).$$

Again, Infl_Rate(TG0) is expected to be highest when TG0 includes a lot of influencers.

KPIs derived from the final reach value can also be used. For example, a lift value L can be computed as the ratio of the final reach value FR to the target size Q:L=FR/Q. This lift value L can be expected to be highest when the target TG0 includes a lot of influencers. A return value R can be computed as the ratio of the final reach value FR to the total size S of the population (number of nodes in SN0): R=FR/S=r×L if the target is r % of the population. The lift value L or the return value can be expected to be highest when the target TG0 includes a lot of influencers.

Depth is a measure of how far influence from the initial target TG0 travels, given that the number of nodes reached generally decreases with distance to the initial target, until no more node gets infected. Depth is the smallest integer K for which the final reach is the set $$\bigcup_{k=1}^{K}$$

$\mathrm{Reach\_Level}_k$, where $\mathrm{Reach\_Level}_k$ is defined progressively from nodes linked into from TG0:

$$\mathrm{Reach\_Level}_1 = \{ j / \exists i \in TG0 : j \in OC_i \text{ and } T_0 < TB_j \leq T_0 + T' \}$$

$$\mathrm{Reach\_Level}_k = \{ j / \exists i \in \mathrm{Reach\_Level}_{k-1} : j \in OC_i \text{ and } TB_i < TB_j \}$$

A good behavioral centrality measure is expected to give rise to large depth values.

Figure 8:
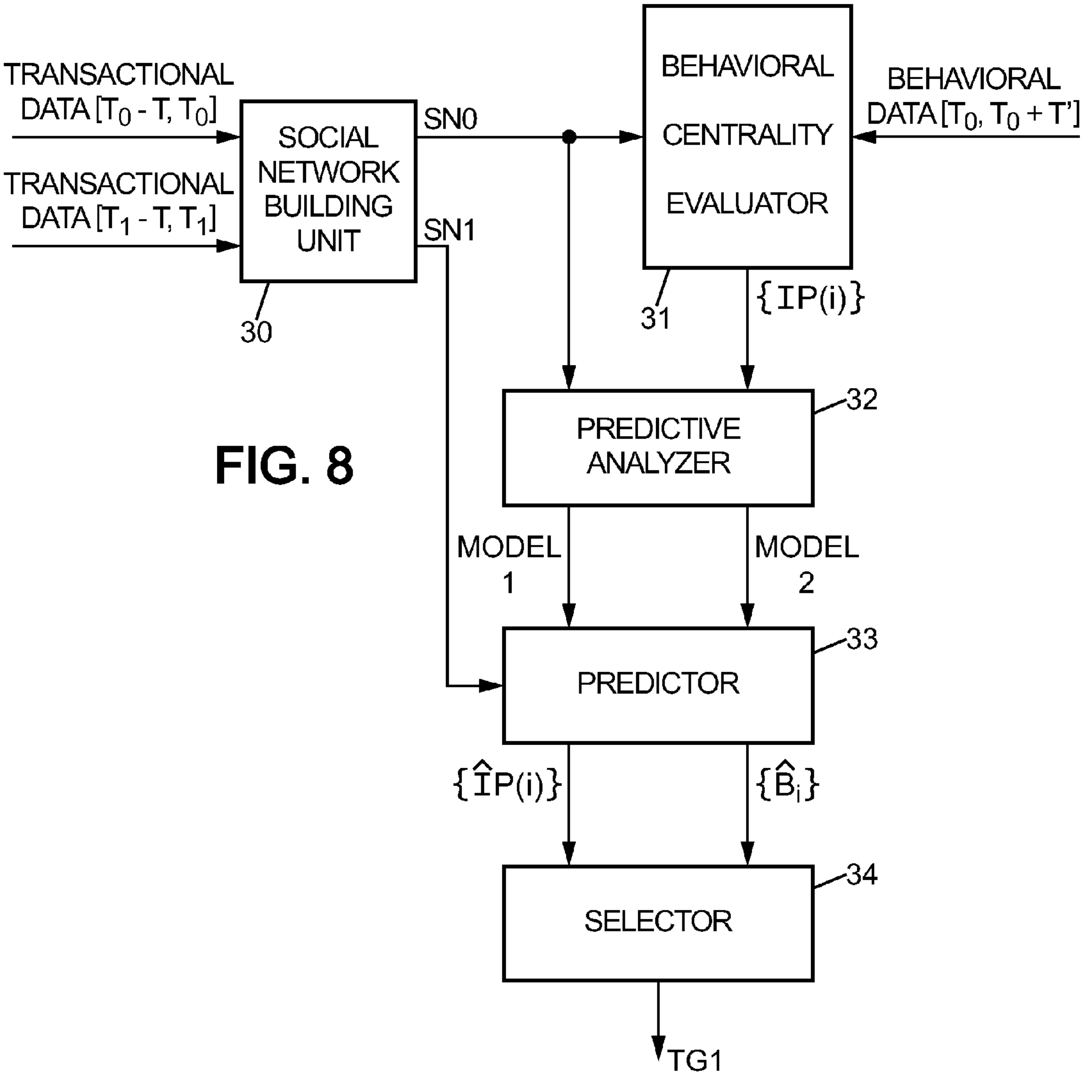
FIG. 8 is a block diagram of a data analysis system in accordance with an embodiment of the invention.

FIG. 8 is a block diagram of an exemplary data analysis system for implementing a method as described above. The unit 30 is in charge of building the social networks SN0 and SN1 from the transactional data obtained for the observation periods $[T_0-T, T_0]$ and $[T_1-T, T_1]$, respectively, and to decorate their nodes with the attributes as mentioned above. The behavioral centrality measures, in the illustration the influence powers IP(i), are computed in an evaluator 31 from the behavioral data relating to the time period $[T_0, T_0+T']$ and the first social network SN0. The predictive analyzer 32 performs the analysis to determine the two predictive models, one for the influence power and the other for the behavioral prediction score. The predictor 33 applies these two models to the second social network SN1 to predict both the influence power $\hat{IP}(i)$ and the behavioral prediction score $\hat{B}_i$ for the nodes i of SN1 in the future period of interest. The selection of the nodes of the target TG1 is finally performed by the selector block 34.

The system of FIG. 8 may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable code can also be distributed over network coupled computer systems so that the computer readable code is stored and executed in a distributed fashion. This media is readable by the computer, stored in the memory, and executed by the processor.

The present invention may be described in terms of functional block components and various processing steps. Such functional blocks may be realized by any number of hardware and/or software components that perform the specified functions. For example, the present invention may employ various integrated circuit components e.g., memory elements, processing elements logic elements, look-up tables, and the like, which may carry out a variety of functions under the control of one or more microprocessors or other control devices. Similarly where the elements of the present invention are implemented using software programming or software elements the invention may be implemented with any programming or scripting language such as C, C++, Java, assembler, or the like, with the various algorithms being implemented with any combination of data structures, objects, processes routines or other programming elements. Functional aspects may be implemented in algorithms that execute on one or more processors. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

While a detailed description of exemplary embodiments of the invention has been given above, various alternatives, modifications, and equivalents will be apparent to those skilled in the art. Therefore the above description should not be taken as limiting the scope of the invention which is defined by the appended claims.

The invention claimed is:

1. A method of selecting a target with respect to a specific behavior as a group of entities in a population of communicating entities, wherein a social network representation is used for the population of communicating entities in a plurality of observation periods, such that, for an observation period, a social network has nodes respectively representing the entities of the population and links between the nodes, each link between two nodes representing at least one communication event observed in said observation period between the entities represented by said two nodes, each node being associated with a respective set of at least one node connected thereto by one of the links, the method comprising:

obtaining a first social network for a first observation period;

obtaining behavioral data indicating adoption of the specific behavior by entities of the population in a time period following the first observation period;

computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;

building a predictive model having input data and first predicted behavioral centrality measures as output data, the predictive model being determined to provide a best match of the computed behavioral centrality measures with first predicted behavioral centrality measures resulting from application of the predictive model to input data from the first social network;

obtaining a second social network for a second observation period more recent than the first observation period;

applying the predictive model to input data from the second social network to provide second predicted behavioral centrality measures; and selecting entities to be in the target based on information including the second predicted behavioral centrality measures, wherein the behavioral centrality measures include, for each node i of the first social network, a respective measure computed as a sum of terms $a_{ij} \times B_j$ for nodes $j \neq i$ belonging to the set of connected nodes associated with node i, where $a_{ij}$ is a weight associated with the link between nodes i and j, $B_j=1$ if node i is associated with an entity that adopted said behavior in said time period according to the behavioral data and $B_j=0$ else.

2. The method as claimed in claim 1, wherein $a_{ij}=1$ for any pair of nodes i, j such that node j belongs to the set of connected nodes associated with node i in the first social network.

3. The method as claimed in claim 1, wherein the links are directed in the social network representation such that, for an observation period, each link from a first node to a second node represents at least one communication event observed in said observation period from the entity represented by the first node to the entity represented by the second node, and wherein, for one node of the first social network, the associated set of connected nodes consists of any other nodes of the first social network such that the first social network has a link from said one node to said other node.

4. The method as claimed in claim 3, further comprising determining influence cascades originating from respective nodes of the first social network, the influence cascade originating from a node $j_0$ being a sequence of distinct nodes $j_1, j_2, \ldots, j_k$ of the first social network for a positive integer k, such that:

for any p=0, . . . , k−1, the first social network has a link from node $j_p$ to node $j_{p+1}$;

the entity represented by node $j_1$ in the first social network adopted said behavior in said time period according to the behavioral data; and for any p=1, . . . , k−1, the entity represented by node $j_{p+1}$ in the first social network adopted said behavior after the entity represented by node $j_p$ in said time period according to the behavioral data.

5. The method as claimed in claim 4, wherein the computed behavioral centrality measures include respective influence reach measures for nodes of the first social network, the influence reach measure for one node of the first social network being the number of distinct nodes of the first social network belonging to at least one influence cascade originating from said one node.

6. The method as claimed in claim 4, wherein the selection of entities in the target uses a selection scheme applied to information including the second predicted behavioral centrality measures, the method further comprising:

applying the same selection scheme to information including the behavioral centrality measures computed from the first social network and the behavioral data to determine a pseudo-target; and determining a final reach value as a number of distinct nodes of the first social network that are in at least one influence cascade of at least one node of the first social network representing an entity of the pseudo-target.

7. The method as claimed in claim 6, further comprising: evaluating performance based on the final reach value.

8. The method as claimed in claim 1, further comprising:

determining a respective behavioral prediction score for each entity of the population using another model for prediction of potential future adoption of the behavior, wherein the selection of entities in the target is based on a combination of the second predicted behavioral centrality measures and the behavioral prediction scores.

9. A data analysis system for selecting a target with respect to a specific behavior as a group of entities in a population of communicating entities, wherein a social network representation is used for the population of communicating entities in a plurality of observation periods, such that, for an observation period, a social network has nodes respectively representing the entities of the population and links between the nodes, each link between two nodes representing at least one communication event observed in said observation period between the entities represented by said two nodes, each node being associated with a respective set of at least one node connected thereto by one of the links, the system comprising:

a behavioral centrality evaluator for receiving a first social network for a first observation period and behavioral data indicating adoption of the specific behavior by entities of the population in a time period following the first observation period, and computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;

a modeling unit for building a predictive model having input data and first predicted behavioral centrality measures as output data, the predictive model being determined to provide a best match of the computed behavioral centrality measures with first predicted behavioral centrality measures resulting from application of the predictive model to input data from the first social network;

a behavioral centrality predictor for receiving a second social network for a second observation period more recent than the first observation period, and applying the predictive model to input data from the second social network to provide second predicted behavioral centrality measures; and a selector for selecting entities to be in the target based on information including the second predicted behavioral centrality measures, wherein the behavioral centrality measures include, for each node i of the first social network, a respective measure computed as a sum of terms $a_{ij}\times B_j$ for nodes $j\neq i$ belonging to the set of connected nodes associated with node i, where $a_{ij}$ is a weight associated with the link between nodes i and j, $B_j=1$ if node j is associated with an entity that adopted said behavior in said time period according to the behavioral data and $B_j=0$ else.

10. A non-transitory computer-readable medium having computer program instructions stored thereon for carrying out steps of a method of selecting a target with respect to a specific behavior when said instructions are executed in a computer processing unit of a data analysis system, the target being selected as a group of entities in a population of communicating entities, wherein a social network representation is used for the population of communicating entities in a plurality of observation periods, such that, for an observation period, a social network has nodes respectively representing the entities of the population and links between the nodes, each link between two nodes representing at least one communication event observed in said observation period between the entities represented by said two nodes, each node being associated with a respective set of at least one node connected thereto by one of the links, said steps comprising:

obtaining a first social network for a first observation period;

obtaining behavioral data indicating adoption of the specific behavior by entities of the population in a time period following the first observation period;

computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;

building a predictive model having input data and first predicted behavioral centrality measures as output data, the predictive model being determined to provide a best match of the computed behavioral centrality measures with first predicted behavioral centrality measures resulting from application of the predictive model to input data from the first social network;

obtaining a second social network for a second observation period more recent than the first observation period;

applying the predictive model to input data from the second social network to provide second predicted behavioral centrality measures; and selecting entities to be in the target based on information including the second predicted behavioral centrality measures, wherein the behavioral centrality measures include, for each node i of the first social network, a respective measure computed as a sum of terms $a_{ij}\times B_j$ for nodes $j\neq i$ belonging to the set of connected nodes associated with node i, where $a_{ij}$ is a weight associated with the link between nodes i and j, $B_j=1$ if node j is associated with an entity that adopted said behavior in said time period according to the behavioral data and $B_j=0$ else.

11. The computer-readable medium as claimed in claim 10, wherein said steps further comprise:

building another predictive model having input data and behavioral prediction scores as output data, the other predictive model being determined to provide a best match of the observed behavior with predicted behavioral prediction scores resulting from application of the other predictive model to input data from the first social network; and applying the other predictive model to input data from the second social network to provide second behavioral prediction scores, and wherein the selection of entities in the target is based on information including the second predicted behavioral centrality measures and the second behavioral prediction scores.

12. The computer-readable medium as claimed in claim 10, wherein the links are directed in the social network representation such that, for an observation period, each link from a first node to a second node represents at least one communication event observed in said observation period from the entity represented by the first node to the entity represented by the second node, and wherein, for one node of the first social network, the associated set of connected nodes consists of any other nodes of the first social network such that the first social network has a link from said one node to said other node.

13. The computer-readable medium as claimed in claim 12, wherein said steps further comprise determining influence cascades originating from respective nodes of the first social network, the influence cascade originating from a node $j_0$ being a sequence of distinct nodes $j_1, j_2, \ldots j_k$ of the first social network for a positive integer k, such that:

for any $p=0, \ldots, k-1$, the first social network has a link from node $j_p$ to node $j_{p+1}$;

the entity represented by node $j_1$ in the first social network adopted said behavior in said time period according to the behavioral data; and for any $p=1, \ldots, k-1$, the entity represented by node $j_{p+1}$ in the first social network adopted said behavior after the entity represented by node $j_p$ in said time period according to the behavioral data.

14. The computer-readable medium as claimed in claim 13, wherein the computed behavioral centrality measures include respective influence reach measures for nodes of the first social network, the influence reach measure for one node of the first social network being the number of distinct nodes of the first social network belonging to at least one influence cascade originating from said one node.

15. The computer-readable medium as claimed in claim 13, wherein the selection of entities in the target uses a selection scheme applied to information including the second predicted behavioral centrality measures, and wherein said steps further comprise:

applying the same selection scheme to information including the behavioral centrality measures computed from the first social network and the behavioral data to determine a pseudo-target; and determining a final reach value as a number of distinct nodes of the first social network that are in at least one influence cascade of at least one node of the first social network representing an entity of the pseudo-target.

16. A method of selecting a target with respect to a specific behavior as a group of entities in a population of communicating entities, wherein a social network representation is used for the population of communicating entities in a plurality of observation periods, such that, for an observation period, a social network has nodes respectively representing the entities of the population and links between the nodes, each link between two nodes representing at least one communication event observed in said observation period between the entities represented by said two nodes, each node being associated with a respective set of at least one node connected thereto by one of the links, wherein the links are directed in the social network representation such that, for an observation period, each link from a first node to a second node represents at least one communication event observed in said observation period from the entity represented by the first node to the entity represented by the second node, and wherein, for one node of the first social network, the associated set of connected nodes consists of any other nodes of the first social network such that the first social network has a link from said one node to said other node, the method comprising:

obtaining a first social network for a first observation period;

obtaining behavioral data indicating adoption of the specific behavior by entities of the population in a time period following the first observation period;

computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;

determining influence cascades originating from respective nodes of the first social network;

building a predictive model having input data and first predicted behavioral centrality measures as output data, the predictive model being determined to provide a best match of the computed behavioral centrality measures with first predicted behavioral centrality measures resulting from application of the predictive model to input data from the first social network;

obtaining a second social network for a second observation period more recent than the first observation period;

applying the predictive model to input data from the second social network to provide second predicted behavioral centrality measures; and selecting entities to be in the target based on information including the second predicted behavioral centrality measures, wherein the influence cascade originating from a node $j_0$ is a sequence of distinct nodes $j_1, j_2, \ldots, j_k$ of the first social network for a positive integer k, such that:

for any $p=0, \ldots, k-1$, the first social network has a link from node $j_p$ to node $j_{p+1}$;

the entity represented by node $j_i$ in the first social network adopted said behavior in said time period according to the behavioral data; and for any $p=1, \ldots, k-1$, the entity represented by node $j_{p+1}$ in the first social network adopted said behavior after the entity represented by node $j_p$ in said time period according to the behavioral data.

17. The method as claimed in claim 16, wherein the computed behavioral centrality measures include respective influence reach measures for nodes of the first social network, the influence reach measure for one node of the first social network being the number of distinct nodes of the first social network belonging to at least one influence cascade originating from said one node.

18. The method as claimed in claim 16, wherein the selection of entities in the target uses a selection scheme applied to information including the second predicted behavioral centrality measures, the method further comprising:

applying the same selection scheme to information including the behavioral centrality measures computed from the first social network and the behavioral data to determine a pseudo-target; and determining a final reach value as a number of distinct nodes of the first social network that are in at least one influence cascade of at least one node of the first social network representing an entity of the pseudo-target.

19. The method as claimed in claim 18, further comprising: evaluating performance based on the final reach value.

20. The method as claimed in claim 16, further comprising:

determining a respective behavioral prediction score for each entity of the population using another model for prediction of potential future adoption of the behavior, wherein the selection of entities in the target is based on a combination of the second predicted behavioral centrality measures and the behavioral prediction scores.

21. A non-transitory computer-readable medium having computer program instructions stored thereon for carrying out steps of a method of selecting a target with respect to a specific behavior when said instructions are executed in a computer processing unit of a data analysis system, the target being selected as a group of entities in a population of communicating entities, wherein a social network representation is used for the population of communicating entities in a plurality of observation periods, such that, for an observation period, a social network has nodes respectively representing the entities of the population and links between the nodes, each link between two nodes representing at least one communication event observed in said observation period between the entities represented by said two nodes, each node being associated with a respective set of at least one node connected thereto by one of the links, wherein the links are directed in the social network representation such that, for an observation period, each link from a first node to a second node represents at least one communication event observed in said observation period from the entity represented by the first node to the entity represented by the second node, and wherein, for one node of the first social network, the associated set of connected nodes consists of any other nodes of the first social network such that the first social network has a link from said one node to said other node, said steps comprising:

obtaining a first social network for a first observation period;

obtaining behavioral data indicating adoption of the specific behavior by entities of the population in a time period following the first observation period;

determining influence cascades originating from respective nodes of the first social network computing respective behavioral centrality measures for the nodes of the first social network, wherein a behavioral centrality measure for one of the nodes depends on adoption or non-adoption of said behavior in said time period by each entity of the population represented by a connected node of the set associated with said one of the nodes;

building a predictive model having input data and first predicted behavioral centrality measures as output data, the predictive model being determined to provide a best match of the computed behavioral centrality measures with first predicted behavioral centrality measures resulting from application of the predictive model to input data from the first social network;

obtaining a second social network for a second observation period more recent than the first observation period;

applying the predictive model to input data from the second social network to provide second predicted behavioral centrality measures; and selecting entities to be in the target based on information including the second predicted behavioral centrality measures, wherein the influence cascade originating from a node $j_0$ is a sequence of distinct nodes $j_1, j_2, \ldots, j_k$ of the first social network for a positive integer k, such that:

for any p=0, . . . , k−1, the first social network has a link from node $j_p$ to node $j_{p+1}$;

the entity represented by node $j_i$ in the first social network adopted said behavior in said time period according to the behavioral data; and for any p=1, . . . , k−1, the entity represented by node $j_{p+1}$ in the first social network adopted said behavior after the entity represented by node $j_p$ in said time period according to the behavioral data.

22. The computer-readable medium as claimed in claim 21, wherein said steps further comprise:

building another predictive model having input data and behavioral prediction scores as output data, the other predictive model being determined to provide a best match of the observed behavior with predicted behavioral prediction scores resulting from application of the other predictive model to input data from the first social network; and applying the other predictive model to input data from the second social network to provide second behavioral prediction scores, and wherein the selection of entities in the target is based on information including the second predicted behavioral centrality measures and the second behavioral prediction scores.

23. The computer-readable medium as claimed in claim 21, wherein the computed behavioral centrality measures include respective influence reach measures for nodes of the first social network, the influence reach measure for one node of the first social network being the number of distinct nodes of the first social network belonging to at least one influence cascade originating from said one node.

24. The computer-readable medium as claimed in claim 21, wherein the selection of entities in the target uses a selection scheme applied to information including the second predicted behavioral centrality measures, and wherein said steps further comprise:

applying the same selection scheme to information including the behavioral centrality measures computed from the first social network and the behavioral data to determine a pseudo-target; and determining a final reach value as a number of distinct nodes of the first social network that are in at least one influence cascade of at least one node of the first social network representing an entity of the pseudo-target.

* * * * *